(12) United States Patent
Giacobbi et al.

(10) Patent No.: US 7,186,300 B2
(45) Date of Patent: Mar. 6, 2007

(54) COMPOSITIONS AND METHODS FOR TREATING SURFACES

(75) Inventors: Emmanuele Giacobbi, Parma (IT); Stefano Scialla, Rome (IT); Paul Stiros, Cincinnati, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

(21) Appl. No.: 11/109,305

(22) Filed: Apr. 19, 2005

(65) Prior Publication Data

US 2005/0187134 A1    Aug. 25, 2005

Related U.S. Application Data

(63) Continuation of application No. 10/003,562, filed on Oct. 24, 2001, now abandoned.

(51) Int. Cl.
| | | |
|---|---|---|
| *B08B 3/04* | (2006.01) | |
| *B08B 7/04* | (2006.01) | |
| *C11D 9/28* | (2006.01) | |
| *C11D 3/37* | (2006.01) | |

(52) U.S. Cl. .............................. 134/26; 134/4; 134/29; 134/42; 510/238; 510/239; 510/240; 510/242; 510/412

(58) Field of Classification Search ................ 510/238, 510/239, 240, 242, 412; 134/4, 26, 29, 42
See application file for complete search history.

(56) References Cited

U.S. PATENT DOCUMENTS

| | | | |
|---|---|---|---|
| 4,347,266 A | | 8/1982 | Norman et al. |
| 4,902,538 A | * | 2/1990 | Piacenti et al. .......... 427/393.6 |
| 5,925,607 A | * | 7/1999 | Flanagan .................... 510/242 |
| 6,183,872 B1 | | 2/2001 | Tanaka et al. |
| 6,262,006 B1 | | 7/2001 | Silvani et al. |
| 6,478,880 B1 | | 11/2002 | Shank |
| 6,964,941 B2 | * | 11/2005 | Argentieri et al. .......... 510/175 |

FOREIGN PATENT DOCUMENTS

| | | | |
|---|---|---|---|
| EP | 0 301 487 A2 | | 2/1989 |
| EP | 0 844 265 A1 | | 5/1998 |
| EP | 844265 | * | 5/1998 |
| JP | 3-275860 | | 6/1991 |
| JP | 3-269184 | | 11/1991 |
| JP | 10-231470 | | 9/1998 |
| WO | WO 02/34815 | * | 5/2002 |

* cited by examiner

*Primary Examiner*—Brian Mruk
(74) *Attorney, Agent, or Firm*—Brent M. Peebles; Kim William Zerby; Steven W. Miller

(57) ABSTRACT

The present invention relates to methods of treating surfaces, to protect or clean said surfaces. The invention more particularly relates to the treatment of interior walls or surfaces, particularly indoor household walls or surfaces, to protect the same from soiling or stains. This invention also relates to compositions, kits and devices for use in the above methods, to protect or clean indoor surfaces. This invention can be applied to various indoor surfaces, such as soft and permeable surfaces, in particular painted walls, wall paper and wallcloth.

13 Claims, No Drawings

COMPOSITIONS AND METHODS FOR TREATING SURFACES

CROSS REFERENCE TO RELATED APPLICATIONS

This application is a continuation of U.S. application Ser. No. 10/003,562, filed Oct. 24, 2001, now abandoned.

TECHNICAL FIELD

The present invention relates to methods of treating surfaces, to protect or clean said surfaces. The invention more particularly relates to the treatment of interior walls or surfaces, particularly indoor household walls or surfaces, to protect the same from soiling or stains. This invention also relates to compositions, kits and devices for use in the above methods, to protect or clean indoor surfaces. This invention can be applied to various indoor surfaces, such as soft and permeable surfaces, and is particularly suited for painted walls, wall paper and wallcloth.

BACKGROUND

The cleaning of interior walls or surfaces, particularly indoor household walls or surfaces represents an important problem, considering the wide variety of potential types of degradations that can affect such surfaces, the precious nature of the surfaces, the environment, etc. As of today, stain, soil or other degradation on the above surfaces, can only be remedied through repainting or replacing of all or part of the surface. These are all very expensive and time-consuming solutions which usually require intervention from an outside professional. Alternatively, household surface cleaning may be achieved through the use of conventional detergents. However, these cannot correctly remedy to the various types of soils or stains and, furthermore, usually alter the material or appearance of the surface itself. There is therefore a need in the art for alternative methods or compositions to clean interior surfaces or materials, in particular indoor household surfaces or materials such as painted walls, wall paper and wallcloth.

DESCRIPTION OF THE INVENTION

The present invention now provides a novel and efficient solution to this problem. More particularly, the present invention stems from a new approach for the cleaning of indoor surfaces or materials, which is based on the use of a protective composition that protects said surfaces and further allows an efficient removal of any type of soil or stain, without altering the surface itself. This invention thus proposes, for the first time, a novel concept of treatment of indoor surfaces to (i) protect them and (ii) improve the cleaning thereof, without altering the material or appearance of the surface.

The present invention thus relates, generally, to a method of treating indoor household surfaces comprising:
applying to all or part of the indoor household surface a first coating composition to form a protective layer, wherein the coating composition is essentially free of pigment and, subsequently removing any soil or stain from said coated surface by applying to the coated surface a cleaning treatment or composition.

The invention thus proposes a novel approach to treat surfaces, to protect the same from degradation (soil, stain, etc.) and facilitate cleaning thereof, without significantly altering the appearance of the surface or material. The protective film can prevent liquids, stains, etc. from being absorbed, so it becomes possible to clean the surface easily, with just a paper sheet or using suitable cleaning compositions, without affecting the underlying original surface or material.

This invention can thus employ two different components: one to deliver protection, and one to clean the surface protected with the previous component.

The protective formulations are generally liquid compositions (preferably aqueous compositions, or gels, paste, etc.) comprising one or several coating agents that are able to bind to the surface to be treated and form a protective coating. More preferably, the agent(s) to be used are able to chemically attach to the surface, to ensure durable protection from spills, stains and soil, and form an essentially transparent coating (or film), so as not to alter the appearance of the surface. Said liquid compositions can be applied by any means known in the art, such as, preferably but without limitation, by a spray (e.g., conventional spray, electrically-operated spray, electrostatic spray, etc.), a brush, roller, sponge, wipe, mop, and the like.

The cleaning formulations are also essentially liquid compositions, such as any conventional cleaning solution, detergent, solvent, and the like. Typically, the cleaning composition comprises solvent(s), preferably fluorinated solvents (or polymers). Said liquid compositions are used to remove stains from the protected surfaces and are preferably specific for the protective formulation (i.e., adapted to the composition of the protective film). They can be applied by any means known in the art, such as, preferably but without limitation, by a spray (e.g., conventional spray, electrically-operated spray, electrostatic spray, etc.), a brush, roller, sponge, wipe, mop, and the like, or used in any of the ways commonly used for standard household cleaning detergents.

The invention may be used to treat various types of indoor or household surface or material, and is particularly suited for treating painted walls, wall paper and wallclothes.

In a more particular and preferred embodiment, the protective composition comprises a fluorinated compound, in particular a fluorinated polymer (or fluoropolymer). Indeed, it has now been found that fluorinated compounds can be applied on indoor wall surfaces, in particular soft and permeable indoor wall surfaces, forming a film thereon, advantageously a transparent film, more preferably a thin, transparent film. The film efficiently protects the treated surfaces from stains or soil, such as pen, ink, coffee, etc. The film allows the stain to be easily removed from the treated surface by wiping, rubbing or cleaning using either conventional products or, advantageously, particular cleaning compositions (or detergents) disclosed in the present application. As will be illustrated in the experimental section, such formulations using fluorinated compounds (e.g., fluoropolymers) show exceptional protection on indoor painted walls, wallpaper and wallcloth, protecting them against spills of liquids, aging, common household stains and general soil.

In this regard, the present invention also relates, generally, to methods of treating indoor surfaces or materials, to protect the same from stain, soil or other degradation, by formation of a protective film thereon. More particularly, the invention relates to methods of treating indoor household surfaces by formation of a protective film thereon, even more preferably using a composition comprising a fluorinated compound (e.g., a fluoropolymer).

An object of the present invention resides more particularly in a method of treating an indoor household surface or material selected from painted walls, wallpaper and wallcloth, to form a protective film thereon, comprising applying to the indoor household surface or material a composition comprising a fluorinated compound (e.g., a fluoropolymer).

An other object of this invention concerns a method of protecting an indoor painted wall, wall paper or wallcloth (e.g., from stain or soil), comprising applying to all or part of the surface of said indoor painted wall, wall paper or wallcloth a composition comprising a fluorinated compound (e.g., a fluoropolymer).

A more particular object of the present invention resides in a method of protecting an indoor wall from stain or soil, comprising applying to all or part of the surface of the wall a composition comprising a fluorinated compound (e.g., a fluoropolymer).

A further aspect of this invention resides in a method of forming a transparent film at the surface of an indoor household surface or material selected from painted walls, wallpaper and wallcloth, comprising applying to all or part of said indoor surface or material a composition comprising a fluorinated compound (e.g., a fluoropolymer).

This invention also resides in the use of a composition comprising a fluorinated compound (e.g., a fluoropolymer), preferably a functionalised fluorinated compound (e.g., a functionalised fluoropolymer):
for the treatment of a painted wall, wallpaper and wallcloth,
  to protect all or part of said surface by formation of a protective film; or
for the protection of painted walls, wall papers or wallclothes from stain or soil.

An other object of this invention resides in the use of a coating composition wherein the coating composition is essentially free of pigment and preferably comprises a fluorinated compound, for the manufacture of a product for treating indoor household surfaces, more particularly a surface selected from a painted wall, wallpaper and wallcloth.

An other object of this invention resides in the use of a coating composition and a cleaning composition, wherein the coating composition is essentially free of pigment and/or dye and preferably comprises a fluorinated compound, and wherein the cleaning composition comprises a cleaning agent, for the manufacture of a product for treating indoor household surfaces, more particularly a surface selected from a painted wall, wallpaper and wallcloth by (i) formation of a protective layer on all or part of the surface and (ii) subsequent cleaning thereof.

A further object of this invention also resides in a method of cleaning an indoor household surface, wherein the surface has been treated as disclosed above, comprising applying to the surface a cleaning composition or treatment, preferably a cleaning composition comprising a solvent.

As mentioned above, the invention is based, in part, on the use of particular agents to form a protective coating or film on indoor household surfaces or materials. More particularly, the treating composition comprises a fluorinated compound.

The fluorinated compound may be any compound whose chemical structure includes a fluorine atom bonded to a carbon atom, preferably a fluoropolymer. The fluorinated compound is preferably a functionalised fluorohydrocarbon, perfluorocarbon, fluoropolyether or perfluoropolyether, that can be substituted or not, saturated or unsaturated, branched or linear. The fluorinated compound can also be, in a preferred embodiment, a polymer including one or several fluorinated carbon chains, such as a fluorinated polycarboxylate, e.g., a fluorinated polymer comprising acrylic or methacrylic monomers, or a fluorinated polymer comprising monomers that carry sulphonic groups such as styrene sulphonate, or fluorinated copolymers including carboxylated and sulphonated monomers, or urethanes or polyurethanes comprising one or several fluorinated chains.

In a more preferred embodiment, the treating composition comprises one or several fluoropolyether(s), more preferably perfluorinated polymer(s), such as perfluoropolyether(s), fluorinated urethane(s) or fluorinated polyurethane(s), or polycarboxylate polymers such as fluorinated polyacrylates. Indeed, as will be described in the examples, these fluorinated materials exhibit advantageous properties for the treatment and protection of indoor surfaces. The fluoropolymers may be optionally combined with fluorinated surfactants or other fluorinated compounds, as described below.

The fluorinated compound is preferably selected from fluorinated polymers having an average molecular weight comprised between 400 and 4000.

In a more specific embodiment, the fluorinated compound is preferably selected from fluorinated polymers having the formula $X-CF_2-(O-C_2F_4)_n-(OCF_2)_m-OCF_2-Y$ or $Cl-(C_3F_6O)_n-CF_2-X$, or $Cl-(C_2F_4O)_n-CF_2-X$, or $X-CF_2-(O-C_2F_4)_n-(OC_3F_6)_p-(OCF_2)_m-OCF_2-Y$ and (partially) hydrogenated forms thereof, wherein m, n and p represent, independently, integer numbers, including 0, m+n or m+n+p being different from 0 and preferably below 50, and wherein X and Y are, independently, $CF_3$ (or an hydrogenated form thereof), a hydrogen atom, a chlorine atom, or a functional group or a different polymer sequence. The expression "hydrogenated form" indicates that a portion of the F atoms may be replaced with H atoms. The above fluorinated polymers or perfluorinated polymers represent preferred ways of performing the invention. It is to be understood that in the above chemical formulae, the groups $OC_2F_4$, $OCF_2$ and $OC_3F_6$ may appear in any sequence in the molecules.

In preferred variant, the fluorinated compound is functionalised to form a covalent or non-covalent bond with the material of the surface to be treated. Indeed, it is preferred to use a composition allowing attachment of the polymer or protective agent to the surface to be treated, to ensure durability of the treatment.

In a preferred embodiment, the fluorinated compound comprises a terminal functional group, which can behave like an anchor, sticking the compound (e.g., polymer) to the wall surface and leaving a protective film over it. More preferably, the terminal functional group is any group that can form a covalent or non-covalent bond with the material of the surface to be treated. Preferred functional groups are capable of forming a covalent chemical bond with the material of the surface to be treated. Typical functional groups are selected from silane, phosphate, carboxylate, alkylamide, polyethoxy, sulphate, sulphonate, amine, for instance $-COOH$, $-CONHC_3H_6(OEt)_nCH_3$, $-CONHC_{18}H_{37}$, $-CONH(CH_2)_3Si(OEt)_3$ and $-[CH_2O(EtO)_n]_mPO(OH)_{3-m}$. The fluorinated compound may comprise a functional group at any one of the chain extremities, or at both. Preferably, the fluorinated compound (e.g., polymer) comprises only one functional group at one of the chain extremities, the other chain extremities being non-functionalized.

In a specific, preferred embodiment, the composition comprises a fluorinated polymer comprising a terminal silane functional group, more preferably a terminal triethoxy silane group on one end of its chain. In this regard, a specific example of a fluorinated polymer to be used in the instant invention is a perfluoropolyether of the general formula Cl—($C_3F_6O$)$_n$—$CF_2$—CONH($CH_2$)$_3$—Si(O—$CH_2$—$CH_2$)$_3$, wherein n is defined as above.

In our technical tests, such a composition is able to deliver very good protection of painted walls against all of the most common and stubborn stains, such as ink, pencil/pastels and tomato sauce. Upon dilution with water, the ethoxy silane group hydrolyzes—becoming Si(OH)$_3$— and works like an "anchor", allowing the perfluorinated molecule to attach to certain surfaces through the formation of a strong covalent or hydrogen bond. Without being bound by theory, this unexpected and advantageous property could result from the fact that the silane interacts with oxygen atoms present in the paint pigments, which are often oxides (e.g. $TiO_2$), and with the hydroxyl and carboxylate groups present in the paint polymers, forming hydrogen or ether-like bonds. The application of the polymer does not change the appearance of the surface, so one can choose to protect either the entire wall, or only the areas that are more likely to get dirty.

Alternatively, the composition may comprise a further agent helping the protective compound(s) to adhere to the surface, such as a glue, binding agent, dispersing polymer, film-forming polymer or cross-linking agent, alone or in combinations.

Fluorinated compounds, in particular fluorinated polymers (and functionalised derivatives thereof) can be prepared by conventional chemical synthesis, by polymerization of monomers. Examples of such conventional techniques are described in EP WO87/00538, EP 695 772 or EP 301 487, incorporated therein by reference. Suitable polymers may also be obtained from commercial sources. In this respect, specific examples of functionalized fluorinated polymers that are suitable for use in the present invention include:

- Ausimont Fluorolink 7007 (ethoxy-)silane perfluoropolyether
- Ausimont Fluorolink 7009 phosphate perfluoropolyether
- Ausimont Fluorolink 7004 carboxylate perfluoropolyether
- Ausimont 5034X fluorinated polyurethane
- Asahi AG 530N perfluoro phosphate
- Dupont FSP perfluoro phosphate
- Fluorinated polycarboxylate polymers, for instance fluorinated polyacrylates.

Colourless, pigment-free compositions designed for coatings for the protection of exterior surfaces of buildings through formation of thick films have been proposed in the art. However, there was no description or suggestion in the prior art to use transparent, pigment-free compositions based on fluorinated compounds, for the protection of indoor walls.

In performing the instant invention, it is preferable to use compositions that can form a thin and/or essentially transparent, colourless film on the treated surface, to ensure that the protective treatment does not significantly modify the appearance of the surface.

In this respect, in a preferred embodiment, the coating (or protective) compositions of this invention are essentially free of pigments and/or dye.

The selection of any coating or protective material for use in the composition of the present invention can be made by measuring the reflectance of the treated surface, for instance by a reflectance spectrophotometer providing results according to the L*a*b* colour scale (CIE 1976). In this regard, it is preferred to use compositions that can form a coating (or film) that does not cause an L*a*b* shift (between treated and non treated surfaces) greater than $DE^*_{ab}=5$, more preferably not greater than $DE^*_{ab}=3$.

L*a*b* colour scale or reflectance can be measured by conventional techniques as described for instance in the instruction manual of the Minolta Chroma Meter CR-200, version 3.0, available from Minolta Co. Ltd., Osaka, Japan.

Typically, the thickness of the film is comprised between 20 nm and 100 microns. However, it should be understood that the thickness of the film also depends on the amount of composition applied to the surface so that the present application is not bound by specific range of thickness.

In a preferred embodiment; the protective composition comprises additional ingredients or additives, to increase the performance or usability of the product. In a particular embodiment, the composition further comprises a fluorosurfactant and/or a solvent.

A fluorosurfactant can be used to increase the solubility of the active fluorinated compound providing protection, in particular its solubility in water. Furthermore, the fluorosurfactant may further contribute to the performance of the composition. Accordingly, the combination of the fluorinated compound and the fluorosurfactant is often synergistic and increases the performance of the method.

Preferred fluorosurfactants to be used in the present invention comprise a functional group selected from sulfate, phosphate, sulphonate or carboxylate functional groups, and combinations thereof.

Typical examples of fluorosurfactants include:
- Dupont Zonyl FSP phosphate fluorosurfactant
- Dupont Zonyl TBS sulphonate fluorosurfactant
- Dupont Zonyl FS-62 sulphonate fluorosurfactant
- Ausimont Fluorolink 7009 phosphate
- Ausimont Fluorolink 7004 carboxylate In this regard, a preferred composition according to this invention comprises a fluoropolymer with a terminal functional group, more preferably a terminal silane functional group, and a fluorosurfactant with a sulphate, sulphonate or carboxylate functional group.

The solvent should preferably be non-offensive in terms of odour or irritation potential. It is believed that any conventional solvent can be used, such as an alcohol (e.g., isopropyl alcohol), ether, ester, etc.

In addition, the composition may further comprise additives, such as one or several agents selected from surfactants, perfumes, stabilizers, emulsifying agents, polyacrylates/methacrylates, polyurethanes, thickeners, antistatic agents, UV light screening agents, optical brighteners, non-fluorinated silicone compounds and film-forming polymers, alone or in various combinations thereof.

In a particular embodiment, non-fluorinated silicone compounds are advantageously added. Indeed, it has now been found that such compounds allow the use of lower contents of fluorinated polymers, without affecting the performance of the composition. Particularly, curable silicone polymers are able to give a synergistic effect with the fluorinated polymer, improving its performance. In addition, film-forming polymers, for instance polycarboxylate polymers such as polyacrylates, can be used in combination with fluorinated compounds or polymers to enhance their performance.

The use of thickeners may facilitate application of the composition on any type of surfaces, including vertical surfaces.

In a particular embodiment, the protective composition is essentially free of pigment and comprises, by weight:
  0.01–40% of a fluorinated compound (e.g., a fluorinated polymer), preferably a functionalized fluorinated compound (e.g., fluorinated polymer), more preferably a functionalized perfluoropolyether, 0–40% of a fluorosurfactant, preferably a functionalised fluorosurfactant,
0–30% of a surfactant,
0–30% of a solvent, in particular an alcohol, ether or ester,
0–50% of a non-fluorinated silicone compound,
0–50% of a polycarboxylate polymer, and
20–99.9% of water.

As indicated above, it is preferred that the protective composition according to this invention be essentially free of pigments, so as not to alter the appearance of the treated surface and/or form an essentially transparent film. Within the context of this invention, the term "essentially free" indicates that, while some small amounts or traces of pigments may be present, the resulting composition essentially does not cause a L*a*b* shift greater than the particular preferred ranges discussed before.

Also, in a further preferred embodiment, the protective composition according to this invention comprises an effective amount of one or several optical brighteners. Such particular compositions are particularly suited for treatment of bright surfaces, including white surfaces.

It should be understood that the coating compositions of this invention may also be used or sold as paint additives and, upon mixing or combined use with paint, contain pigments.

A more preferred protective composition of this invention is essentially free of pigment and comprises:
  a) a perfluoropolyether with silane functional group (0.01–40%)
  b) fluorosurfactant(s) selected from phosphates, sulfates, sulphonates, carboxylates and fluorinated alkyl polyethers (0–50%)
  c) one or several surfactants (0–40%);
  d) isopropyl alcohol (0–30%); and
  e) water (20–99.9%).

Even more preferably, the above formulations comprise:
  0.1–50% of a fluorosurfactant, even more advantageously 0.2–30% of a fluorosurfactant, and/or
  0.5–40% of a surfactant, more preferably 5–15%, and/or
  0.2–30% of an alcohol, even more preferably 5–25%.

Specific examples of fluoropolymers and fluorosurfactants are as mentioned above. It should be understood that many other different commercially available fluoropolymers and fluorosurfactants can be effectively used in these formulations.

The composition can be applied by any suitable means or device, such as preferably but without limitation, by a spray (e.g., conventional spray, electrically-operated spray, electrostatic spray, etc.), brush, roller, sponge, wipe, mop, and the like. In a typical embodiment, the composition is applied using a roll with an auto-dispenser, a spray or a brush. Furthermore, as indicated above, the composition may be applied to all or only portions an indoor household wall or surface.

The amount of composition applied to the surface may be adapted by the skilled person in a broad range, depending on the composition itself, the surface to be treated, etc. Typically, amounts of protective composition within the range of 10 to 300 g/m$^2$ are applied, more preferably 20–250 g/m$^2$, even more preferably 30–200 g/m$^2$. The composition is usually applied in one single layer. However, it is possible to apply several layers, if desired. Also, while the protective film may resist for longer periods of time, it can be replaced or re-applied at different time intervals, depending on the composition, surface and cleaning frequency.

Once a surface has been treated by the above compositions or methods, it becomes very easy to remove any stain, soil, dirt or degradation, using either conventional cleaning compositions, products or treatments or, preferably, specific cleaning compositions, adapted to the coating.

In this regard, an object of this invention resides in a method of cleaning an indoor household surface, wherein the surface has been treated by a method as described above, comprising applying to the surface a cleaning composition, preferably comprising a solvent.

In particular, if one applies a solution containing the above fluorinated compound(s) on a painted wall and then produces stains on the surface, for instance using a pen or a pastel, it is possible to remove the stains almost completely by rubbing them with a piece of paper. Without the polymer protection, not only are the stains not removed, but usually they are spread on a larger area while rubbing. Alternatively, instead of just rubbing with a (dry) piece of paper, a solvent can be used to remove the stains, or a wipe, sponge, etc.

In a more preferred embodiment, the treated surface is cleaned with a cleaning composition adapted to the coating. Such cleaning compositions are generally liquid, may be aqueous or non-aqueous, and comprise at least one surfactant or at least one solvent, more preferably a fluoropolymer. Such compositions may comprise, more specifically, one or several agents selected from perfluoropolyethers, hydroperfluoropolyethers, fluorinated solvents, fluorosurfactants, non-fluorinated surfactants, glycols, ethers, polyethoxylated alcohols, esters, linear or branched hydrocarbons, etc. Said liquid compositions are used to remove stains from the protected surfaces and are specific for the protective formulation. They can be applied by spraying it over the stain or by a wipe, a sponge, or any other convenient means as mentioned above. The cleaning composition may also be formulated as a powder, gel, paste, cream, foam, etc.

More preferred solvents are (per)fluoropolyethers (non-functionalized), of the general formula (I) or (II) represented below, where m and n are integers as defined above, or hydrogenated forms thereof:

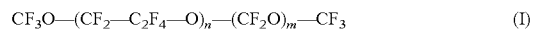

$$CF_3O-(CF_2-C_2F_4-O)_n-(CF_2O)_m-CF_3 \qquad (I)$$

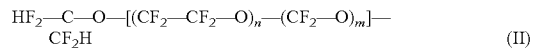

$$HF_2-C-O-[(CF_2-CF_2-O)_n-(CF_2-O)_m]-CF_2H \qquad (II)$$

These species are liquids with different evaporation rates and viscosities depending on their molecular weight. In this respect, preferred fluorinated solvents to be used in the cleaning compositions have an average molecular weight comprised between 180 and 1600, even more preferably between 500 and 1000. They do not have affinity for the wall surface because they lack the anchoring group present in their functionalized homologues. Due to their high chemical inertness, they do not alter the appearance/color of the surface, which is what can happen using other solvents. We speculate that the effectiveness of these solvents is linked with their similarity to the functionalized polymers that form the protective film. After a stain is applied on the wall surface, it somehow "sits" on the protective film formed by the functionalized fluorinated polymer. The fluorinated solvent used to remove the stain is able to dissolve part of the protective film (due to the similar nature of the two fluorinated compounds), with the result that the stain is mobilized and taken off the surface. Fluoropolymers of formula (I) are particularly preferred.

Specific examples of suitable fluorinated solvents are Ausimont Galden D-02 and D-03, H-Galden "grado C", H-Galden "grado D" and Galden D-100.

Preferred cleaning compositions comprise:
one or several non-functionalized fluoropolymer (0.01–100% by weight)
one or several fluorosurfactants (0–20% by weight)
one or several (non-fluorinated) solvents (0–99.9%, by weight), and
one or several (non-fluorinated) surfactants (0–50% by weight).

More preferably, the composition comprises:
one or several perfluoropolyether and hydrogenated perfluoropolyethers of the general formula (I) and/or (II) as defined above;
one or several fluorosurfactants such as ionic surfactants as described above, non-ionic fluorosurfactants such as perfluoropolyether alkylamide-functionalized, or zwitterionic fluorosurfactants,
a solvent comprising one or several of the following agents: ethers, n-buthoxy-propoxy-propanol, di(propylene glycol)methylether, glycols, alcohols, hexane or other hydrocarbon solvents, and
one or several non-fluorinated surfactants such as alkyl sulphates, alkyl sulphonates, alkyl ethoxysulphate, alkyl ethoxysulphonates, alkyl ethoxyalcohols, alkyl aminoxides, alkyl polyglucosides, betaïne, sulpho-betaïne, sarcosinates, etc.

Examples of typical compositions comprise:
Galden HT200 (from Ausimont) in the range of 0.01%–100%, or
Galden D02 (from Ausimont) in the range of 0.01%–100%, or
Galden D100 (from Ausimont) in the range of 0.01%–100%, or
H-Galden "grado B" (from Ausimont) in the range of 0.01%–100%, or
H-Galden "grado c" (from Ausimont) in the range of 0.01%–100%, and
Ausimont Fluorolink 7006 alkylamide fluorosurfactant (0–20%)
n-butoxy-propoxy-propanol in the range of 0%–40%,
di(propylene glycol) methyl ether in the range of 0%–40%,
glycols, ethers, or polyethoxylated alcohols in the range of 0%–100%, and
hexane or other aliphatic solvents in the range of 0%–90%, and
alkyl sulphates or other ionic surfactants (0–40%), and
alkyl ethoxy alcohols or other non-ionic surfactants (0–40%), and
betaïne or other zwitterionic surfactants (0–40%), Such cleaning products may be applied using a spraying device, a wipe, a sponge, etc., as indicated above.

A further object of the present invention resides in a composition, suitable for treating indoor household walls or materials, the composition comprising a fluoropolymer as defined above. Preferably, the composition comprises a fluoropolymer with a terminal silane functional group and a fluorosurfactant with a sulphate, phosphate or sulphonate functional group. The composition may further comprise one or several agents selected from surfactants, perfumes, stabilizers, emulsifying agents, thickeners, antistatic agents, UV light screening agents, non-fluorinated silicone compounds and film-forming polymers, or combinations thereof.

The preferred, specific nature and type and respective amounts of the polymer(s) or other constituent(s) are as defined above.

A further object of this invention lies in a composition suitable for cleaning treated indoor household walls or materials comprising a fluoropolymer, more particularly:
one or several perfluoropolyether and hydrogenated perfluoropolyethers of the general formula (I) and/or (II) as defined above;
a fluorosurfactant,
a solvent comprising one or several of the following agents: ethers, n-buthoxy-propoxy-propanol, di(propylene glycol)methylether, dioxane, glycols, esters, alcohols, hexane or other hydrocarbon solvents, and
a non-fluorinated surfactant.

The preferred, specific nature and type and respective amounts of the polymer(s) or other constituent(s) are as defined above.

An other object of this invention is a kit or a product for treating household surfaces or material, in particular painted walls, wall paper and wallcloth, comprising, separately formulated:
a protective composition, wherein said protective composition is essentially free of pigment and comprises a fluorinated compound, and
a cleaning composition comprising a solvent and/or a surfactant.

Preferably, the protective composition comprises a fluoropolymer.

In this regard, a preferred object of this invention is a kit or product for treating household surfaces or material, in particular painted walls, wall paper and wallcloth, comprising, separately formulated:
a protective composition comprising a functionalised perfluoropolyether, and
a cleaning composition comprising a fluoropolymer, preferably a perfluoropolyether.

A further object of this invention is a kit or product (or a pre-mix) for treating household surfaces or material, in particular painted walls, wall paper and wallcloth, comprising, separately formulated:
an essentially pigment-free protective composition comprising a fluorinated compound,
a painting, and
optionally, a cleaning composition adapted to the protective composition and/or painting.

The specific nature and type and respective amounts of the polymer(s) or other constituent(s) of these compositions are as defined above. The compositions are preferably liquid, and may be formulated in any appropriate device (bottle, bag, etc.). Also, the above kits may further comprise a device to apply the protective composition, in particular a roll, spray, brush, sponge, wipe, mop.

The present invention is particularly suited and efficient for treating virtually any interior surface or material selected from painted walls, wall paper and wallcloth. The surface may be located in any area, such as kitchen hall, living room, bedrooms, bathrooms, stairs, etc.

The invention can be used to protect the above surfaces from all kinds of degradation, soil, stain, dirt, aging etc. It may be used to protect and remove spilled liquids such as wine, oil, coffee, etc., stains such as ink, pen, pastel, pencil, crayon, fingerprints, or other common household soils such as tomato, ketchup, mustard, etc.

With this development wallpaper, wallcloth and painted walls can be cleaned without affecting the underlying original surface. Wallpaper and wallcloth can be easily washed with water and/or a common household detergent. The walls can also be cleaned by wiping the stains with the specific cleaner, which is effective with surfaces protected with formulations according to this invention. The paint is not affected by the scrubbing action thanks to the lubricant proprieties of the liquid cleaner.

Further aspects and advantages of the present invention will be disclosed in the following examples, which should be regarded as illustrative and not limiting the scope of the present application.

EXAMPLES 1–3

Preparation of Protective Compositions

The following protective compositions were prepared by mixing together the indicated ingredients.

| Protective formulations<br>Component | WB1<br>w/w % | WB2<br>w/w % | WB3<br>w/w % |
|---|---|---|---|
| Ausimont silane perfluoropolyether | 8 | 8 | — |
| Ausimont phosphate fluorosurfactant | 4 | — | — |
| DuPont phosphate fluorosurfactant | — | — | 17.5 |
| DuPont sulphonate fluorosurfactant | — | 4 | — |
| IPA | 18 | 8 | 10 |
| Water | 70 | 80 | 72.5 |

EXAMPLES 4–6

Preparation of Cleaning Compositions

The following Cleaning compositions were prepared by mixing together the indicated ingredients.

| Cleaning formulations<br>Component | WBSR1<br>w/w % | WBSR2<br>w/w % | WBSR3<br>w/w % |
|---|---|---|---|
| Ausimont Galden D-02 | 100 | — | 70 |
| Ausimont H-Galden "grado D" | — | 26 | 30 |
| n-butoxy-propoxy-propanol | — | 5 | — |
| hexane | — | 59 | — |
| Ausimont Galden D-100 | — | 10 | — |

EXAMPLE 7

Protection and Cleaning Performance

The compositions disclosed in Examples 1–3 were applied to painted wall (or wallpaper or wallcloths). When red wine or oil are spilled on said surfaces previously treated with said formulations, the surface is not stained. The protective film of fluoropolymer prevents the liquid from being absorbed, so it is possible to clean the wall with just a paper sheet.

When a wall previously treated with said formulation gets stained by pen, pencil, crayon, ketchup, mustard, etc., the stain is easily and efficiently removed by wiping it with the liquid cleaner compositions of examples 4–6.

What is claimed is:

1. A method of treating indoor household surfaces comprising:
applying to all or part of the indoor household surface a first coating composition comprising a functionalized fluorinated compound, a non-fluorinated silicone compound and a fluorosurfactant to form a durable protective layer, and, subsequently removing any soil or stain from said coated surface by applying to the coated surface a cleaning treatment composition, said cleaning treatment composition comprising one or several non-functionalized fluoropolymers.

2. A method of cleaning an indoor household surface, wherein the surface has been treated by a method of claim 1 wherein said cleaning treatment composition comprises at least one of a solvent and a surfactant.

3. The method of claim 1 wherein said one or several non-functionalized fluoropolymers is a (per)fluoropolyether (non-functionalized) of one of the general formulas: (I) $CF_3O\text{—}(CF_2\text{—}C_2F_4\text{—}O)_n\text{—}(CF_2O)_m\text{—}CF_3\text{—}$; (II) $HF_2C\text{—}O\text{—}[(CF_2CF_2O)_n\text{—}(CF_2O)_m]\text{—}CF_2H$, wherein m and n represent, independently, integer numbers, including 0, m+n being different from 0; and hydrogenated forms thereof.

4. The method of claim 1 wherein the fluorinated compound is a fluorinated polymer.

5. The method of claim 1 wherein the fluorinated compound is a perfluorinated polymer.

6. The method of claim 1 wherein the fluorinated compound is functionalized to form a covalent or non-covalent bond with the material of the surface to be treated.

7. The method according to claim 6 wherein the fluorinated compound comprises one or more functional groups selected from the group consisting of: silane, phosphate, carboxylate, alkylamide, polyether, sulphonate, sulphate and amine.

8. The method of claim 1 wherein the fluorinated compound has an average molecular weight of between 400 and 4,000.

9. The method of claim 1 wherein the fluorinated compound is selected from the group consisting of fluorinated polymers having the formula: $X\text{—}CF_2\text{—}(O\text{—}C_2F4)_n\text{—}(OCF_2)_m\text{—}OCF_2\text{—}Y$; $Cl\text{—}(C_3F_6O)_n\text{—}CF_2\text{—}X$; $Cl\text{—}(C_2F_4O)_n\text{—}CF_2\text{—}X$; or $X\text{—}CF_2\text{—}(O\text{—}C_2F_4)_n\text{—}(OC_3F_6)_p\text{—}(OCF_2)_m\text{—}OCF_2\text{—}Y$, and (partially) hydrogenated forms thereof, wherein m, n and p represent, independently, integer numbers, including 0, m+n or m+n+p being different from 0, wherein X and Y are, independently, $CF_3$ or an hydrogenated form thereof, a hydrogen atom, a chlorine atom, or a functional group or a different polymer sequence.

10. The method of claim 1 wherein the fluorosurfactant comprises a functional group selected from sulphonate, carboxylate, sulphate and phosphate functional groups.

11. The method of claim 10 wherein the first coating composition comprises a fluoropolymer with a terminal silane functional group and a fluorosurfactant with a sulphate, sulphonate or phosphate functional group, or combinations thereof.

12. The method according to claim 1 wherein the first coating composition further comprises one or more agents selected from the group consisting of: surfactants, perfumes, stabilizers, emulsifying agents, polycarboxylate polymers, thickeners, antistatic agents, UV light screening agents, optical brighteners, and film-forming polymers, alone or in various combinations thereof.

13. The method according to claim 1 wherein the first coating composition is applied by a sprayer, brush, roller, sponge, wipe or a mop.

* * * * *